US012613141B2

(12) United States Patent (10) Patent No.: US 12,613,141 B2

Foreman, Jr. (45) Date of Patent: Apr. 28, 2026

(54) CONICAL SEAL FITTING AND ASSEMBLIES THEREWITH

(71) Applicant: Foreman Instrumentation & Controls, Inc., Houston, TX (US)

(72) Inventor: Timothy H. Foreman, Jr., Houston, TX (US)

(73) Assignee: Foreman Instrumentation & Controls, Inc., Houston, TX (US)

( * ) Notice: Subject to any disclaimer, the term of this patent is extended or adjusted under 35 U.S.C. 154(b) by 653 days.

(21) Appl. No.: 18/125,253

(22) Filed: Mar. 23, 2023

(65) Prior Publication Data

US 2023/0314236 A1 Oct. 5, 2023

Related U.S. Application Data

(60) Provisional application No. 63/325,730, filed on Mar. 31, 2022.

(51) Int. Cl.
G01K 1/14 (2021.01)
F16L 41/00 (2006.01)
F16L 41/14 (2006.01)

(52) U.S. Cl.
CPC .............. G01K 1/14 (2013.01); F16L 41/008 (2013.01); F16L 41/14 (2013.01)

(58) Field of Classification Search
CPC .. G01K 1/14; G01K 1/08; G01K 7/02; G01K 7/023; F16L 41/008; F16L 41/14; F16J 15/002; F16J 15/008; F16J 15/06; G01M 3/26
USPC ........................................................ 374/208
See application file for complete search history.

(56) References Cited

U.S. PATENT DOCUMENTS

| | | | | |
|---|---|---|---|---|
| 1,890,006 A | * | 12/1932 | Swift | G01K 1/14 374/208 |
| 3,845,661 A | * | 11/1974 | Hollweck | G01K 1/146 392/441 |
| 4,032,177 A | | 6/1977 | Anderson | |
| 4,662,659 A | | 5/1987 | Blose et al. | |
| 4,709,725 A | | 12/1987 | Morrison | |

(Continued)

FOREIGN PATENT DOCUMENTS

| | | |
|---|---|---|
| EP | 0857297 B1 | 3/2002 |
| WO | WO 2021126900 A1 | 6/2021 |

*Primary Examiner* — John E Breene
*Assistant Examiner* — Janice M Soto
(74) *Attorney, Agent, or Firm* — Stephen S. Hodgson

(57) ABSTRACT

A conical seal fitting (CSF) has a longitudinal bore between proximal and distal ends, an exterior conical sealing surface near the distal end and an exterior shoulder between the proximal end and the exterior conical sealing surface. A flange has a through-hole defined by an interior conical sealing surface and interior threads. A gland nut surrounds the CSF and has exterior threads that engage the interior threads. The gland nut presses against the exterior shoulder to push the two conical sealing surfaces together to form a seal. The CSF has an O-ring received in a groove and a trapped annular space is defined between the O-ring and the seal. The flange has a test port extending from outside of a vessel into the annular space. The annular space can be pressurized through the test port to test the seal. A tube passes through the bore and is sealed with the CSF using a ferrule and a nut.

38 Claims, 9 Drawing Sheets

(56)                    References Cited

U.S. PATENT DOCUMENTS

| | | | |
|---|---|---|---|
| 4,877,271 A * | 10/1989 | McCorkle | F16L 19/005 |
| | | | 285/382.7 |
| 5,285,853 A | 2/1994 | Eckert et al. | |
| 6,453,539 B1 * | 9/2002 | Brugmann, Jr. | F16L 13/141 |
| | | | 29/523 |
| 6,481,761 B2 | 11/2002 | Schroeder et al. | |
| 7,465,086 B1 * | 12/2008 | Foreman, Jr. | G01K 1/08 |
| | | | 73/866.5 |
| 8,701,467 B2 | 4/2014 | Carns et al. | |
| 10,996,113 B2 | 5/2021 | Foreman, Jr. | |
| 11,262,013 B2 | 3/2022 | Tom et al. | |
| 2002/0148279 A1 | 10/2002 | Weyl et al. | |
| 2022/0026303 A1 | 1/2022 | Spanggaard et al. | |

* cited by examiner

CONICAL SEAL FITTING AND ASSEMBLIES THEREWITH

CROSS REFERENCE TO RELATED APPLICATIONS

This application claims priority to and the benefit of U.S. Provisional Patent Application Ser. No. 63/325,730 filed on Mar. 31, 2022, which is incorporated by reference.

BACKGROUND OF THE INVENTION

1. Field of the Invention

This present invention pertains to a fitting received in a flange with a metal-to-metal conical seal and more particularly to a fitting-and-flange assembly in which the seal can be tested and monitored.

2. Description of the Related Art

FIG. 1 is a side elevation view partially in cross-section of a thermowell mounting system TMS that includes a thermocouple-thermowell assembly T, which will be fastened into a flange FL. The thermocouple-thermowell assembly T has a distal end D that will be placed inside a process vessel, a pipe, a machine or another apparatus in which temperature is to be measured. The flange FL will be bolted to and sealed against a similar flange. A hollow fitting F surrounds the thermocouple-thermowell assembly T and has external national pipe taper (NPT) threads Te sized to engage internal threads Ti that define a pass-through hole in the flange FL. A nut N has internal threads for engaging the fitting F. Nut N presses two ferrules F1 and F2 against the thermocouple-thermowell assembly T for sealing assembly T with the fitting F. An NPT fitting C fastens a thermocouple assembly within the thermocouple-thermowell assembly T. A thermocouple wire seal TS seals the thermocouple assembly in the assembly T and provides a connection to a head H from which the thermocouple assembly can transmit temperature measurement data. The prior art represented by FIG. 1 is described in U.S. Pat. Nos. 7,465,086 and 10,996, 113, issued to Foreman, Jr., each of which is incorporated by reference. A problem that sometimes occurs is a leak where the threads Te on the fitting F engage the threads Ti in the flange FL, which makes it necessary to shut down the process, pipe, machine or apparatus in order make repairs or to replace the thermowell mounting system TMS.

SUMMARY OF THE INVENTION

In one embodiment, the present invention provides a conical seal fitting (CSF) that has a generally tubular shape, proximal and distal ends, a length between the proximal and distal ends and a longitudinal bore throughout the length. The CSF has an exterior conical sealing surface proximal to the distal end for making a seal, which is preferably a metal-to-metal seal. The exterior conical sealing surface has an angle relative to the longitudinal axis of the CSF, which is preferably between 54 and 66 degrees, and a preferred angle is about 59 degrees. The CSF has a first portion adjacent to the conical sealing surface and toward the proximal end, which preferably has a first groove around its circumference that is spaced apart from the exterior conical sealing surface. An O-ring is preferably received in the first groove, and the first portion preferably does not have external threads. The CSF has a second portion adjacent to the first portion and toward the proximal end. The first and second portions have outside diameters, where the outside diameter of the second portion is less than the outside diameter of the first portion, and a first shoulder is defined at a transition between the first and second portions. The second portion preferably has a groove for receiving a retaining ring. The CSF preferably has a third portion adjacent to the second portion that terminates at the proximal end of the CSF. The third portion preferably has an interior conical surface adjacent to the proximal end configured to receive a ferrule and an exterior threaded surface configured to receive a nut for providing a ferrule swage-type compression seal. The CSF preferably has a cylinder between the distal end and the exterior conical sealing surface. The cylinder preferably has a smaller outside diameter than the smallest outside diameter of the exterior conical sealing surface and a shoulder defined at a transition between the two.

The present invention provides in another aspect a load gland or gland nut surrounding the CSF fitting. The load gland has proximal and distal ends, and the distal end of the load gland abuts the first shoulder on the CSF. The load gland has an exterior surface with exterior threads near the distal end. The proximal end of the load gland preferably has opposing flat surfaces configured for receiving a wrench such as provided by a hex nut or a square nut or fixture points for receiving a spanner wrench. A retaining ring is preferably received in the groove in the second portion of the CSF, and the load gland is held between the first shoulder on the CSF and the retaining ring.

The present invention provides in another aspect a flange that is a solid disk having opposing proximal and distal sides, where the flange has a through-hole between its proximal and distal sides, which is at least partially defined by interior threads. The through-hole is preferably radially centered in the flange. The flange preferably has an interior conical sealing surface in the through-hole, which is preferably designed and configured to matingly engage the exterior conical sealing surface on the CSF for providing a seal, preferably a metal-to-metal seal. The flange preferably has a test port in its proximal side and a duct that provides a flow path between the test port and the through-hole. A block of material can be used rather than an entire flange, where the block of material has the same through-hole defined in part by interior threads toward the proximal side and an interior conical sealing surface toward the distal side and test port arrangement.

Another embodiment of the present invention is a flange-and-fitting assembly that includes the CSF fitting, the load gland surrounding the CSF fitting and the flange, where the exterior threads on the load gland are engaged with the interior threads in the through hole in the flange. Tightening the load gland into the flange causes the exterior conical sealing surface on the CSF fitting to form preferably a metal-to-metal seal with the interior conical sealing surface in the through hole in the flange. The exterior conical sealing surface on the CSF fitting preferably has an angle relative to the longitudinal axis of the CSF fitting of about 59 degrees. The interior conical sealing surface in the flange preferably has an angle relative to the longitudinal axis of the flange that is very slightly greater than the angle on the exterior conical sealing surface on the CSF fitting. The angle of the interior conical sealing surface is preferably about 60 degrees. The interior and exterior conical sealing surfaces are expected to deform slightly, which is expected to improve the seal between the two surfaces. An O-ring is preferably included to provide a secondary seal to the primary metal-to-metal seal between the conical surfaces. With an O-ring preferably in the groove in the first portion of the CSF fitting, an annular space is defined between the metal-to-metal seal and the O-ring. The test port in the flange is preferably in fluid communication with the annular space through the duct, thereby providing a means for testing the metal-to-metal seal by pressurizing the annular space with a fluid such as a gas.

One end-use application for the flange-and-fitting assembly is for sealing a thermowell-thermocouple assembly in a flange to make a flange-and-thermowell-thermocouple assembly, which has a metal-to-metal seal between the thermowell-thermocouple assembly and the flange. The metal-to-metal seal can be tested to ensure no leakage after the flange-and-thermowell-thermocouple assembly is manufactured and assembled, but before it is installed in its end-use application. The metal-to-metal seal can also be tested on an ongoing basis or from time to time after the flange-and-thermowell-thermocouple assembly is installed to determine whether the metal-to-metal seal is leaking or not. The flange-and-fitting assembly can be used to seal any tubular assembly in any type of vessel, pipe, reactor or tank that has a positive or negative pressure relative to atmospheric pressure, thereby providing a means for sealing various types of sensors in various types of containers.

BRIEF DESCRIPTION OF THE DRAWINGS

A better understanding of the invention can be obtained when the detailed description of exemplary embodiments set forth below is considered in conjunction with the attached drawings in which.

DETAILED DESCRIPTION OF THE EXEMPLARY EMBODIMENTS

Figure 2:
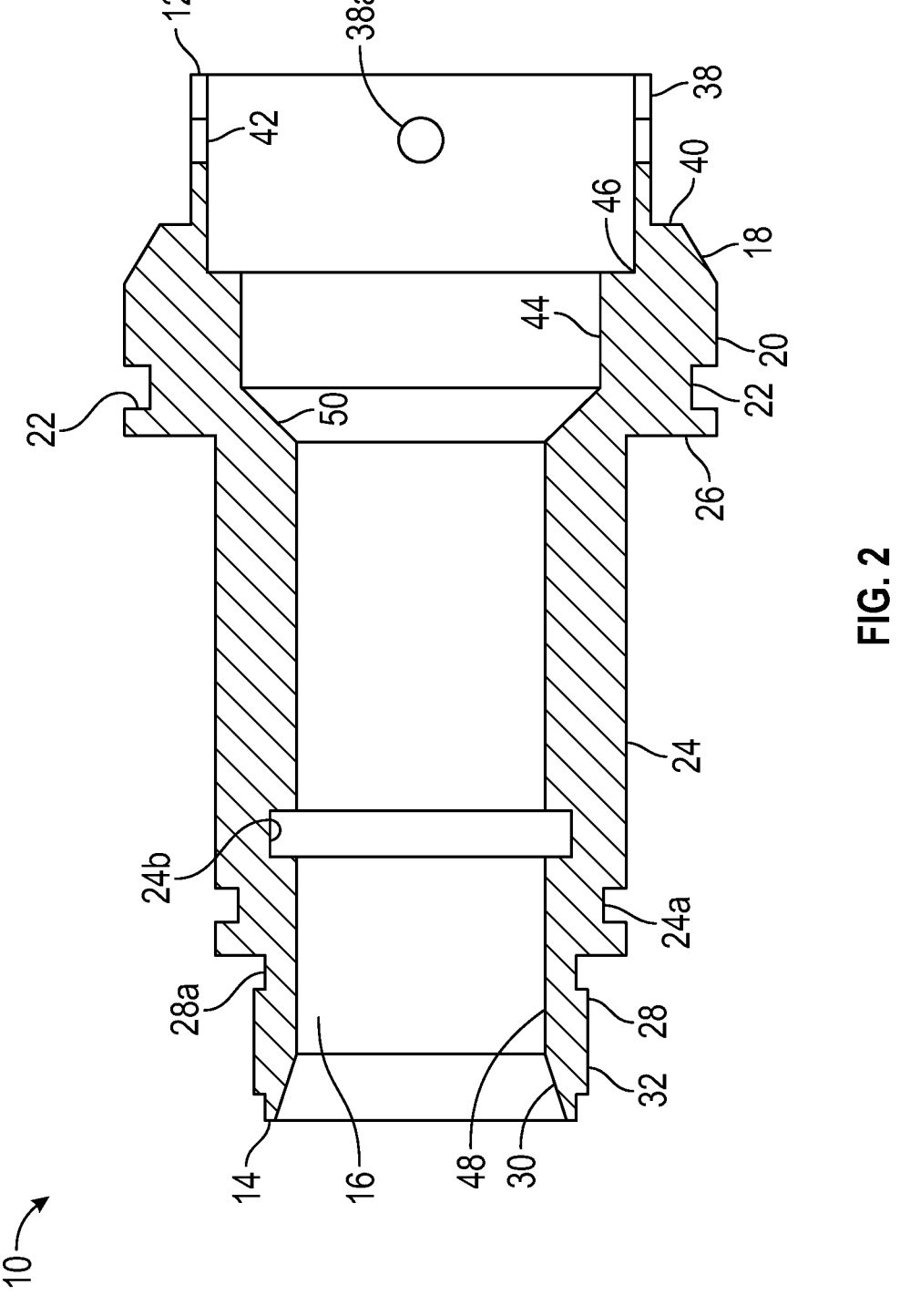
FIG. 2 is a side elevation in cross section of a conical seal fitting, according to the present invention.

The present invention provides a fitting-and-flange assembly having a metal-to-metal seal in which the seal can be tested and monitored. FIG. 2 is a side elevation in cross section of a conical seal fitting (CSF) 10. CSF 10 has a generally tubular shape, a distal end 12, a proximal end 14, a length between the proximal and distal ends and a longitudinal bore 16 throughout the length. In an end-use application, the distal end 12 may be near or in contact with a process, and the proximal end 14 may be closer to a person installing or monitoring the CSF fitting 10. CSF 10 has an exterior conical sealing surface 18 proximal to the distal end 12 in which the conical sealing surface 18 has a circumference that reduces in the direction of from the proximal end toward the distal end, as an arrowhead pointing from the proximal end 14 toward the distal end 12. The exterior conical sealing surface 18 typically has an angle between about 40 and 80 degrees, preferably between about 50 and 70 degrees or between 55 and 65 degrees and more preferably has a 59-degree angle relative to the longitudinal axis of the CSF 10 through the center of the bore 16.

CSF 10 has a first portion 20 adjacent to the conical sealing surface 18 and toward the proximal end 14. The first portion 20 has a first groove 22 around its circumference that is spaced apart from conical sealing surface 18. The first portion 20 has an exterior surface between the first groove 22 and the conical sealing surface 18, which preferably does not have threads. This is mentioned because there is a class of fittings that terminate with an external conical sealing surface, but that class of fittings has exterior threads adjacent to the conical sealing surface. As will be discussed below, CSF 10 does not use or rely on exterior threads adjacent to the conical sealing surface 18 for achieving a seal using the conical sealing surface 18. The exterior surface between the first groove 22 and the conical sealing surface 18 is preferably smooth and preferably has a circular perimeter. The applicant believes that CSF 10 is suitable for much harsher conditions with respect to pressure and temperature than the class of prior art fittings that have exterior threads where CSF 10 has a smooth exterior between the first groove 22 and the conical sealing surface 18. CSF 10 has a second portion 24 adjacent to the first portion 20 and toward the proximal end 14. The second portion 24 preferably has an exterior second groove 24a around its circumference for receiving a retaining ring as described below. The second portion 24 also preferably has an optional internal groove 24b cut into a wall that defines the bore through the second portion for receiving an optional O-ring, which is not shown in FIG. 2. An O-ring in groove 24b will provide a secondary seal around a tubular element received in CSF 10 as discussed below. The first portion 20 has a greater outside diameter than the second portion 24, and a first shoulder 26 is defined at a transition between the first portion 20 and the second portion 24. CSF 10 has a third portion 28 adjacent to the second portion 24 and toward the proximal end 14. The third portion 28 has an outside diameter that is less than the outside diameter of the second portion 24. An end of the third portion 28 coincides with the proximal end 14.

The third portion 28 has an interior conical surface 30 and an exterior threaded surface 32 adjacent to the proximal end 14. Interior conical surface 30 is designed and configured to receive a ferrule, and exterior threaded surface 32 is designed and configured to receive a nut. Interior conical surface 30 and exterior threaded surface 32 are designed and configured to receive a ferrule against the interior conical surface 30 and a nut engaged with the exterior threads 32 for pushing the ferrule against the interior conical surface 30 for providing a seal around a tube received in the longitudinal bore 16 in a compression fit. The ferrule, the nut and the tube are not shown in FIG. 1. The nut squeezes the ferrule into the proximal end 14 against the interior conical surface 30 and around and against the tube for sealing the tube in the CSF fitting 10. A groove 28a in the exterior surface of the third portion 28 provides thread relief. The threads that the CSF 10 has at the exterior threaded surface 32 are preferably the only threads that CSF 10 has.

CSF 10 preferably has a hollow cylinder 38 that extends between the distal end 12 and the exterior conical sealing surface 18. Cylinder 38 has a longitudinal axis that coincides with the longitudinal axis of the first, second and third portions of the CSF fitting 10. The cylinder 38 preferably has a constant circumference that is less than the smallest circumference of the conical sealing surface 18, and a second shoulder 40 is defined at a transition between the exterior conical sealing surface 18 and the cylinder 38. Cylinder 38 preferably has one or more holes 38a, preferably three or four holes spaced evenly around the cylinder 38. The holes 38a are defined by interior threads and are configured to receive screws that press against a tube received in CSF 10.

CSF 10 preferably has a first inside wall 42 that extends from the distal end 12 through the cylinder 38 and into the conical seal portion 18. CSF 10 preferably has a second inside wall 44 that extends from the first inside wall 42 toward the proximal end 14. The first inside wall 42 has a first inside diameter, and the second inside wall 44 has a second inside diameter, which is less than the first inside diameter. An interior shoulder 46 is preferably defined at a transition between the first inside diameter and the second inside diameter. CSF 10 preferably has a third inside wall 48 that extends from the proximal end 14 through the third portion 28 and preferably through all or most of the second portion 24. The third inside wall 48 has a third inside diameter, which is less than the second inside diameter of the second inside wall 44. An interior conical surface 50 preferably provides a transition from the larger inside diameter of second inside wall 44 and the smaller inside diameter inside third wall 48.

Figure 3:
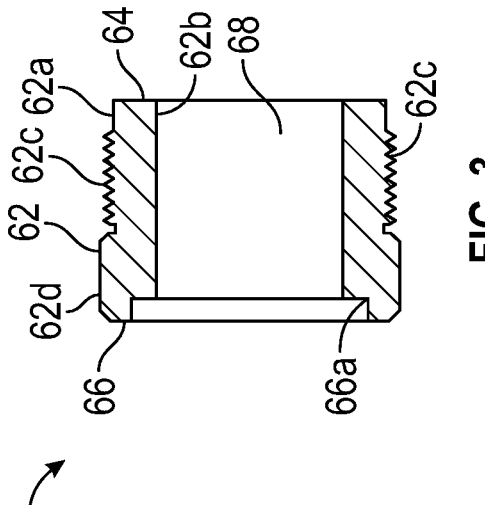
FIG. 3 is a side elevation in cross section of a load gland or gland nut, according to the present invention.

FIG. 3 is a side elevation in cross section of a load gland 60, which is a hollow tubular fitting that is placed around the CSF fitting 10 as will be explained in more detail below. Load gland 60 has a tubular side wall 62, a distal end 64 and a proximal end 66. Load gland 60 has a length between the distal end 64 and the proximal end 66 and a bore 68 throughout its length. The tubular side wall 62 is preferably generally circular in a transverse cross section and has a thickness between an exterior surface 62a and an interior surface 62b, which is preferably a smooth surface. The exterior surface 62a has exterior threads 62c along a portion of its length toward the distal end 64. The exterior surface 62a at the proximal end 66 of the tubular side wall 62 is formed preferably into a hex nut 62d, or preferably at least two opposing flat sides, for receiving a wrench for tightening the threads 62c into interior threads as will be explained further below. Alternatively, the exterior surface 62a at the proximal end 66 can have one or more internal or external fixture points for receiving a spanner wrench. The exterior threads 62c are between the hex nut 62d and the distal end 64 of the load gland 60. The proximal end 66 of the load gland 60 is preferably notched to provide an indentation 66a for receiving a retaining ring as will be explained below. A retaining ring could simply abut the proximal end 66, but the indentation 66a provides a more compact arrangement of components in a final assembly.

Figure 4B:
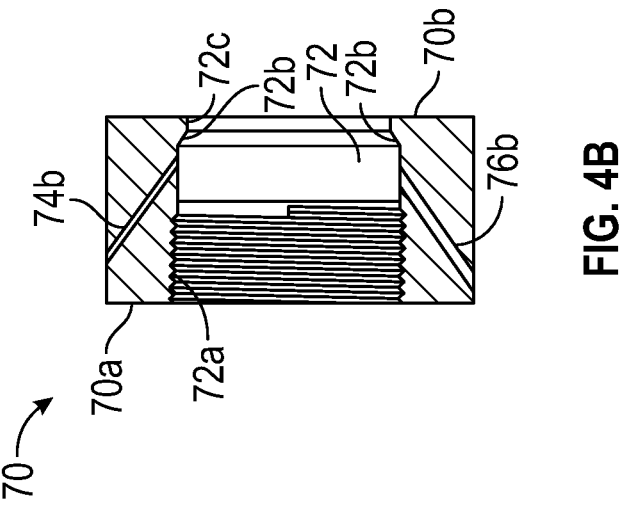
FIG. 4B is an enlarged portion of FIG. 4A.
Figure 4A:
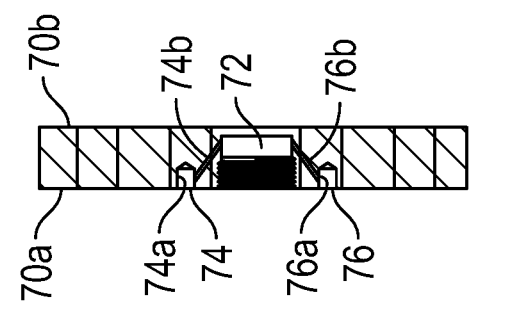
FIG. 4A is a cross section of a side elevation of the flange of FIG. 4 as seen along the line 4A-4A.
Figure 4:
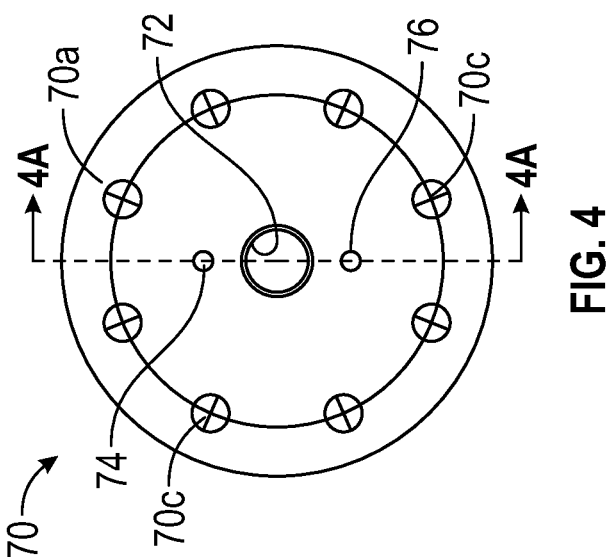
FIG. 4 is a front elevation of a flange, according to the present invention.

FIG. 4 is a front elevation of a flange 70, which is a solid circular disk that can be bolted to a flanged opening into a process vessel that is typically operated at a high temperature and at a high pressure. FIG. 4A is a cross section of a side elevation of flange 70 as seen along the line 4A-4A. Flange 70 has a proximal side 70a, which would be outside the process vessel after installation, and a distal side 70b, which would be subject to the temperature and pressure conditions inside the process vessel after installation. Flange 70 has a plurality of bolt holes 70c in a circular arrangement near its perimeter. Bolts can be passed through the bolt holes 70c for fastening flange 70 to the flanged opening, which would have corresponding holes. Flange 70 has a central opening 72 that passes from the proximal side 70a to the distal side 70b. Flange 70 preferably has two test ports 74 and 76, although one test port is sufficient. Each of the test ports 74 and 76 provides an open passageway or duct from the proximal side 70a of the flange 70 to the central opening 72 in the flange 70. Each of the test ports 74 and 76 has a bore 74a and 76a, respectively, defined by interior threads and open to the proximal side 70a of the flange 70. Each of the test ports 74 and 76 has a duct 74b and 76b, respectively, between bore 74a and 76a, respectively, and the central opening 72 in the flange 70. The test ports 74 and 76 provide tubular openings from the proximal side 70a of the flange 70 to the central opening 72, which can be sealed by screwing a plug having exterior threads into the bores 74a and 76a, which have interior threads. An unneeded test port can be closed more permanently by welding. The test ports 74 and 76 would typically be plugged while in operation.

FIG. 4B is an enlarged portion of the flange 70 as seen in FIG. 4A, which provides an enlarged view of the central opening 72. Flange 70 has a thickness between the proximal side 70a and the distal side 70b. The central opening 72 for about half of that thickness on the proximal side 70a is defined by interior threads 72a, which are designed, configured and sized to receive the exterior threads 62c on the load gland 60. The central opening 72 has a first inside diameter on the proximal side 70a of the flange 70 and a smaller second inside diameter on the distal side 70b of the flange 70. An interior conical sealing surface 72b provides a transition between the greater first inside diameter and the lesser second inside diameter. Interior conical sealing surface 72b is located near, but is spaced apart from, the distal side 70b. An abutment or inside wall 72c is provided between the interior conical sealing surface 72b and the distal side 70b of the flange 70. The central opening 72 has the lesser second inside diameter along the abutment or inside wall 72c. Interior conical sealing surface 72b is designed, configured and sized to receive the exterior conical sealing surface 18 on the CSF fitting 10 in a metal-to-metal seal. Interior conical sealing surface 72b preferably has an angle that is the same or slightly greater than the angle of the exterior conical sealing surface 18, which is preferably between 50 and 70 or 55 and 65 degrees, although a slightly lesser or equal angle may be satisfactory. In a preferred embodiment, interior conical sealing surface 72b preferably has an angle of about 60 degrees relative to the longitudinal axis of the flange 70, and exterior conical sealing surface 18 preferably has an angle of about 59 degrees relative to the longitudinal axis of the flange 70. The applicant believes that slightly different angles between these sealing surfaces will result in deformation during tightening and better sealing. The test ports 74 and 76 in the flange 70 provide a means for testing and monitoring the metal-to-metal seal to ensure there is no leakage through the sealing area.

Figure 5:
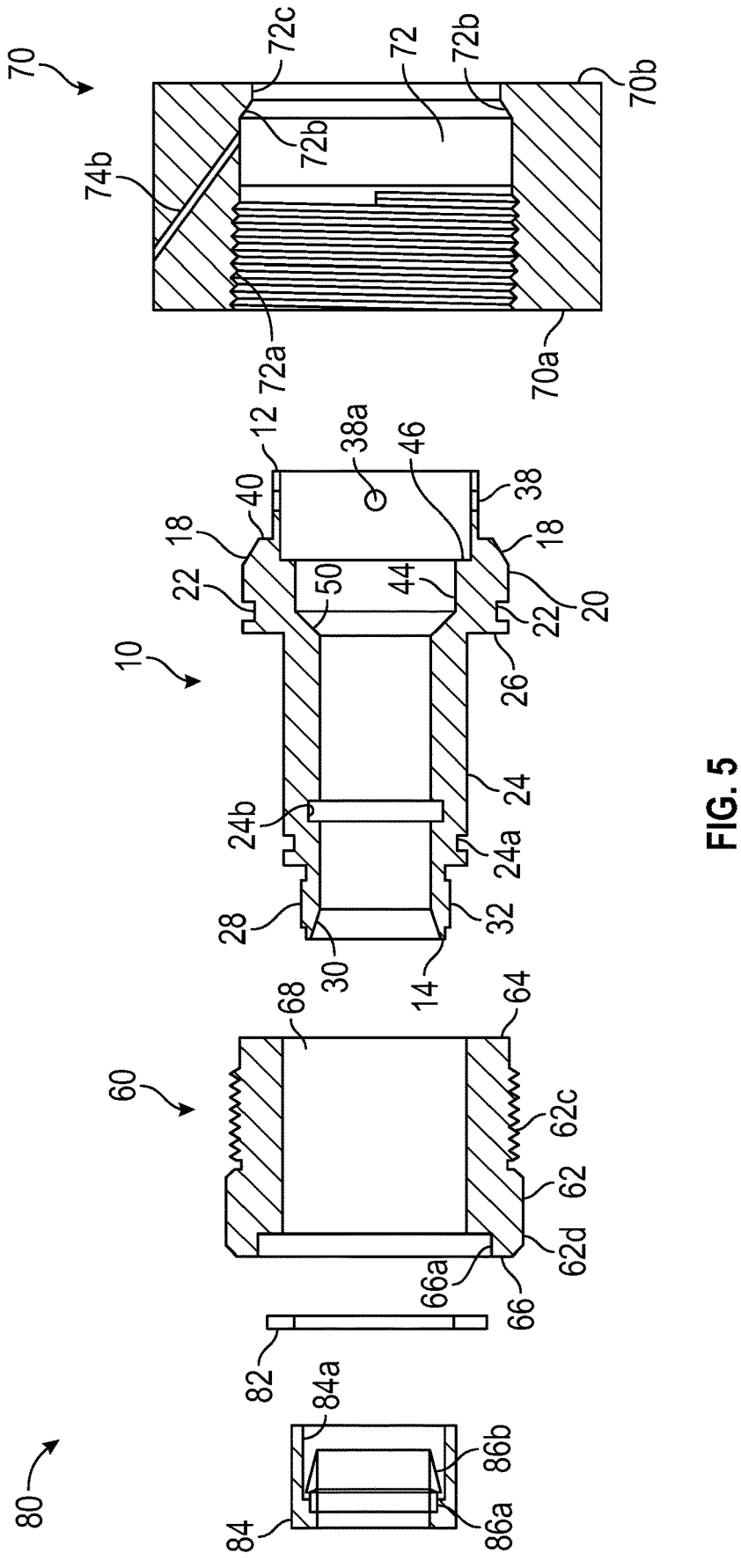
FIG. 5 is an exploded view of a side elevation in cross section of a flange-and-fitting assembly, according to the present invention.
Figure 6:
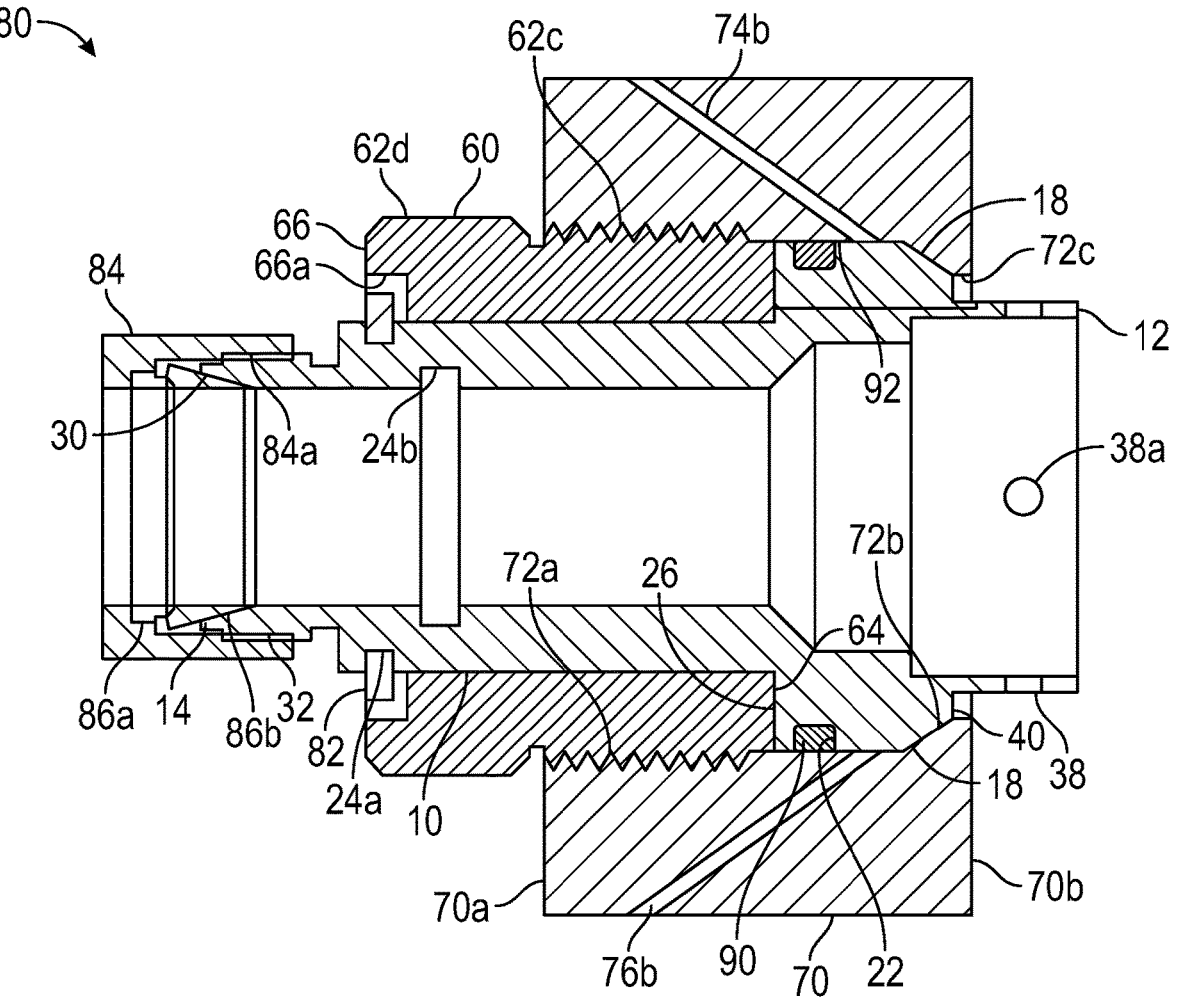
FIG. 6 is a side elevation in cross section of the flange-and-fitting assembly of FIG. 5 after assembly.

FIG. 5 is an exploded view of a side elevation in cross section of a flange-and-fitting assembly 80, which includes the flange 70, where the portion shown in FIG. 4B is shown in FIG. 5, the conical seal fitting 10 of FIG. 2, the load gland 60 of FIG. 3, a retaining ring 82, a nut 84 and ferrules 86*a* and 86*b*. A dual ferrule arrangement is preferred, although a single ferrule may perform satisfactorily. The distal end 12 of the conical seal fitting 10 goes inside the central opening 72 in the flange 70. A metal-to-metal seal is formed by tight contact between the exterior conical sealing surface 18 and the interior conical sealing surface 72*b* in the central opening 72 in the flange 70. One component of the flange-and-fitting assembly 80 that is not shown in FIG. 5, but which is shown in FIG. 6, is an O-ring 90 received in the groove 22 in CSF 10. O-ring 90 provides a secondary seal with respect to the primary metal-to-meatal seal. The load gland 60 is received around CSF 10 and threaded into the flange 70. The exterior threads 62*c* on the load gland 60 engage the interior threads 72*a* in the central opening 72 in the flange 70. Tightening the load gland 60 presses the distal end 64 of the load gland 60 against the first shoulder 26 on the CSF fitting 10, which presses the exterior conical sealing surface 18 on CSF 10 against the interior conical sealing surface 72*b* in the central opening 72 in the flange 70, thereby forming the metal-to-metal seal. Retaining ring 82 is received in the second groove 24*a* in the CSF 10 fitting and in the indentation 66*a* in the load gland 60. The retaining ring 82 abuts the load gland 60 and prevents the load gland 60 from backing out of engagement with the flange 70. A tube (not shown in FIG. 5) is received within and through the flange 70, the CSF fitting 10, the load gland 60, the retaining ring 82, the ferrules 86*a* and 86*b* and the nut 84. Nut 84 has interior threads 84*a*, which engage exterior threads 32 on the proximal end 14 of the CSF fitting 10. Tightening the nut 84 causes the ferrule 86*b* to engage the interior conical surface 30 on CSF 10, and the ferrules 86*a* and 86*b* form a seal with the tube that is not shown in FIG. 5, thereby sealing the tube with the flange-and-fitting assembly 80. The nut 84 and the ferrules 86*a* and 86*b* provide a dual (two-piece) ferrule swage-type compression seal. An O-ring is preferably received in internal groove 24*b* to provide a secondary seal around a tube received in the flange-and-fitting assembly 80.

FIG. 6 is a side elevation in cross section of flange-and-fitting assembly 80 after it has been assembled. A partial view of flange 70 is included in FIG. 6. O-ring 90 is shown received in the first groove 22. The exterior conical sealing surface 18 on the CSF fitting 10 is pressed against and engaged with the interior conical sealing surface 72*b* in the central opening 72 in the flange 70. An annular space 92 is defined between flange 70, CSF fitting 10, the metal-to-metal seal between the conical sealing surfaces 18 and 72*b* and the O-ring 90. Duct 74*b* of test port 74 opens into the annular space 92, thereby providing a flow path between the bore 74*a* in the proximal side of the flange 70 and the annular space 92. The second test port 76 described with reference to FIGS. 4A and 4B is optional and is not shown in FIG. 5 or 6. Test port 74 (not shown) is used to test the metal-to-metal seal between the conical surfaces 18 and 72*b* by flowing a gas or air into the annular space 92 until a desired pressure is reached and then monitoring to determine whether the pressure remains constant, which indicates the metal-to-metal seal is operating properly, or whether the pressure decreases, which indicates that either the metal-to-metal seal or the O-ring seal 90 is leaking. A flow meter, a pressure gauge or a pressure monitoring system can be connected to the interior threads that define the bore 74*a* (not shown) in the test port 74 for testing the seal for a leak and for ongoing monitoring of the metal-to-metal seal while the flange-and-fitting assembly 80 is in operation. If both ports 74 and 76 are used, then a gas can be passed through the annular space 92. The gas can be monitored for an indication of leakage of the metal-to-metal seal and can be disposed of properly.

Figure 1:
FIG. 1 is a side elevation view partially in cross-section of a thermowell mounting system used in the prior art.

The flange-and-fitting assembly 80 of FIG. 6 can be used to replace the flange FL and the fitting F in the prior art FIG. 1. The test port 74 with its duct 74*b* connected to the annular space 92 between the metal-to-metal seal 18-72*b* and the O-ring 90 allows for testing whether the metal-to-metal seal 18-72*b* leaks after assembly and before shipping to a customer or prior to a start up of a unit in which installed and for ongoing monitoring after start up. The only way to test the integrity of the seal between the fitting F and the flange FL in the prior art thermowell mounting system TMS of FIG. 1 is to install the flange FL in a vessel and to pressurize the vessel, which is cost prohibitive. Failure of the seal between the fitting F and the flange FL in the prior art thermowell mounting system TMS of FIG. 1 after installation and start up by the end user can be a significant expense for the end user. The inventive flange-and-fitting assembly 80 of FIG. 6 allows the manufacturer to test the metal-to-metal seal 18-72*b* prior to shipping the product to the end user. The inventive flange-and-fitting assembly 80 of FIG. 6 also allows the end user to monitor the flange-and-fitting assembly 80 of FIG. 6 on an ongoing basis to detect a leak and to make plans for repair or replacement and to vent leaking gas to a safe location.

Figure 7:
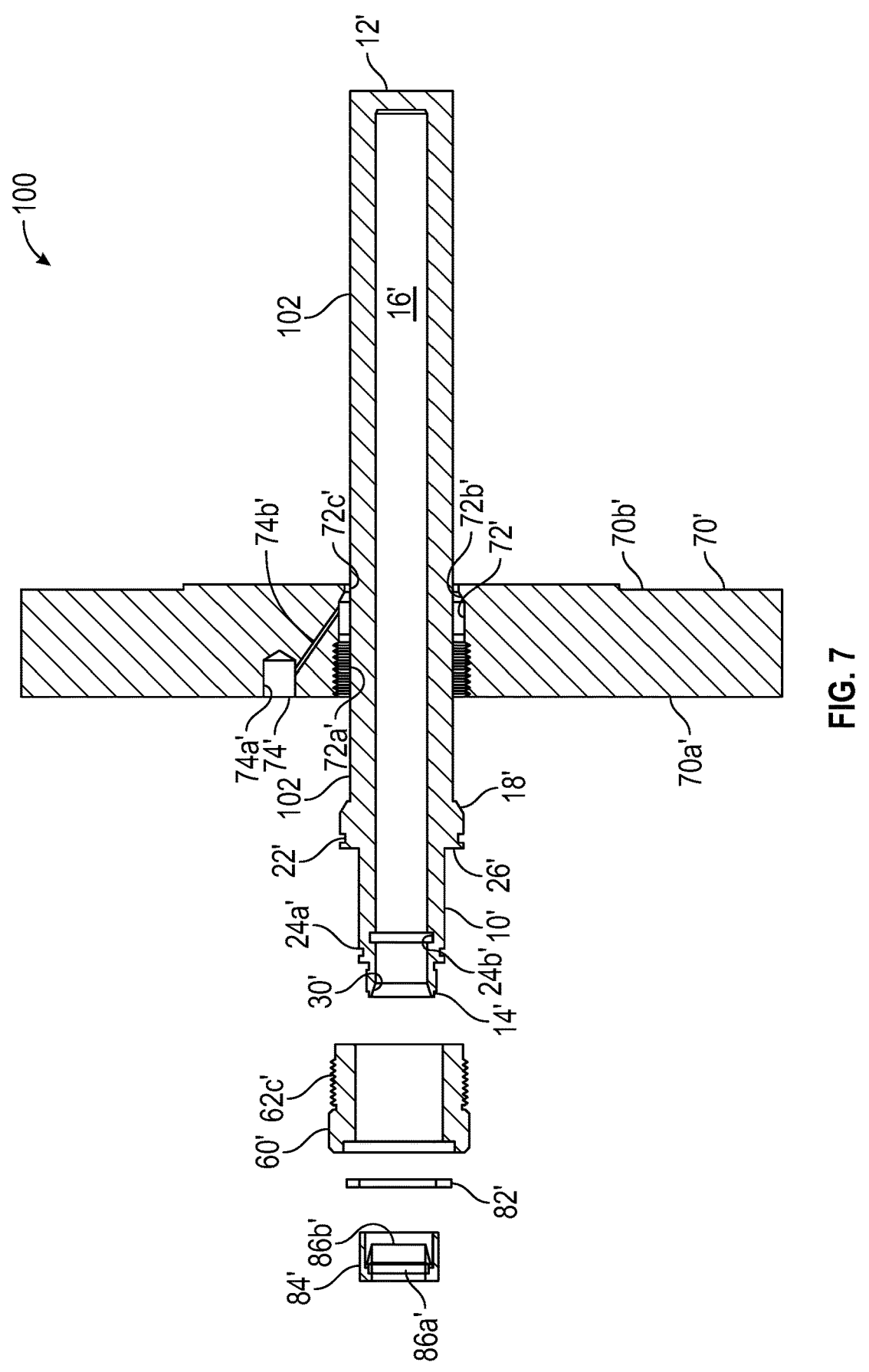
FIG. 7 is an exploded side elevation in cross-section of a flange and thermowell assembly before assembly, according to the present invention.
Figure 7A:
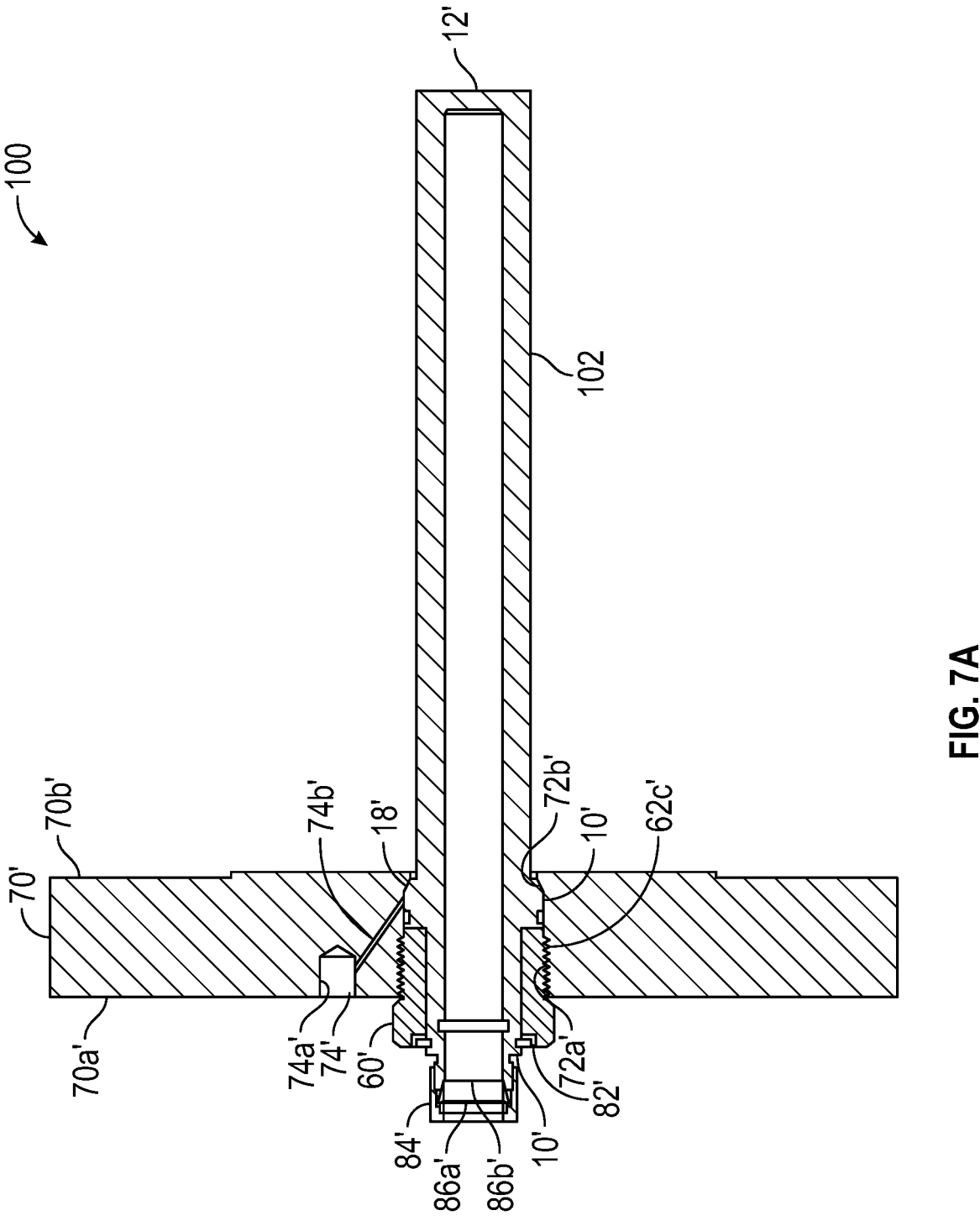
FIG. 7A is the flange and thermowell assembly of FIG. 7 after assembly.

FIG. 7 illustrates one end-use application of the present invention in a modified Van Stone thermowell assembly. FIG. 7 is a side elevation in cross-section of a flange and thermowell assembly 100 in an exploded view, according to the present invention. FIG. 7A is a side elevation in cross-section of the flange and thermowell assembly 100 of FIG. 7 after assembly. The conical seal fitting (CSF) 10 of FIG. 2 has been modified for the end-use application illustrated in FIG. 7, and a thermowell tube 102 in FIG. 7 has replaced the hollow cylinder 38 shown in FIG. 2. Flange and thermowell assembly 100 includes a conical seal fitting (CSF) 10' that preferably has all the features CSF 10 in FIG. 2, except thermowell tube 102 has replaced the hollow cylinder 38 in an integral assembly. As discussed above, a thermowell tube can be connected to CSF 10 using screws through holes 38*a* in FIG. 2, which provides a benefit of a somewhat flexible connection. The conical seal fitting (CSF) 10' of FIG. 7 is an integral, unitary, single part that is preferably machined from a single bar stock. CSF 10' has a generally tubular shape, an enclosed distal end 12', a proximal end 14', a length between the proximal and distal ends and a longitudinal bore 16' throughout the length. CSF 10' has an exterior conical sealing surface 18' that has a circumference that reduces in the direction of from the proximal end toward the distal end. Thermowell tube 102 extends between the conical sealing surface 18' and the distal end 12'. CSF 10' of FIG. 7 is the same as and has all the same features as CSF 10 of FIG. 2, except thermowell tube 102 in FIG. 7 has replaced hollow cylinder 38 in FIG. 2.

FIG. 7 is similar to FIG. 5, except thermowell tube 102 has replaced hollow cylinder 38. FIG. 5 is an exploded view of a side elevation in cross section of the flange-and-fitting assembly 80, which includes the flange 70, where the portion shown in FIG. 4B is shown in FIG. 5, the conical seal fitting 10 of FIG. 2, the load gland 60 of FIG. 3, a retaining ring 82, a nut 84 and ferrules 86*a* and 86*b*. FIG. 7 is an exploded view of a side elevation in cross section of the flange and thermowell assembly 100, which includes a flange 70' or a portion of a flange, the conical seal fitting 10', a gland nut 60' that is identical to the load gland 60 of FIG. 3, a retaining ring 82', a nut 84' and ferrules 86*a'* and 86*b'*.

Flange 70' has a thickness between a proximal side 70a', a distal side 70b' and a central opening 72'. For about half of that thickness on the proximal side 70a, the central opening 72' is defined by interior threads 72a', which are designed, configured and sized to receive exterior threads 62c' on the gland nut 60'. The central opening 72' has a first inside diameter on the proximal side 70a' of the flange 70 and a smaller second inside diameter on the distal side 70b' of the flange 70'. An interior conical sealing surface 72b' provides a transition between the greater first inside diameter and the lesser second inside diameter. Interior conical sealing surface 72b' is located near, but is spaced apart from, the distal side 70b'. An abutment or inside wall 72c' is provided between the interior conical sealing surface 72b' and the distal side 70b' of the flange 70. The central opening 72' has the lesser second inside diameter along the abutment or inside wall 72c'. Interior conical sealing surface 72b' is designed, configured and sized to receive the exterior conical sealing surface 18' on the CSF fitting 10' in a metal-to-metal seal. Interior conical sealing surface 72b' preferably has an angle that is the same or slightly greater than the angle of the exterior conical sealing surface 18', which is preferably between 50 and 70 or 55 and 65 degrees, although a slightly lesser or equal angle may be satisfactory. In a preferred embodiment, interior conical sealing surface 72b' preferably has an angle of about 60 degrees relative to the longitudinal axis of the flange 70', and exterior conical sealing surface 18' preferably has an angle of about 59 degrees relative to the longitudinal axis of the flange 70'.

Flange portion or flange 70' has the central opening 72', a test port 74', which has a bore 74a', and an open passageway or duct 74b' from the proximal side 70a' of the flange 70' to the central opening 72' in the flange 70'. The bore 74a' is preferably defined by interior threads and is open to the proximal side 70a' of the flange 70'. Flange portion or flange 70' can be a full flange such as shown in FIG. 4 or a block similar to the partial flange shown in FIG. 4B. CSF 10' has a groove 22' for receiving an O-ring 90' (not shown), as was described with reference to FIG. 6. An annular space 92' is defined between flange 70', CSF fitting 10', the metal-to-metal seal between the conical sealing surfaces 18' and 72b' and the O-ring 90'. Duct 74b' of test port 74' opens into the annular space 92', thereby providing a flow path between the bore 74a' in the proximal side of the flange 70' and the annular space 92' in the same manner as was described with reference to FIG. 6.

A thermocouple assembly for temperature measurement such as described in U.S. Pat. Nos. 7,465,086 and 10,996,113, issued to Foreman, Jr., is preferably received in the thermowell tube 102 for the end-use application of the flange and thermowell assembly 100 described with reference to FIGS. 7 and 7A. Various other sensors may be in the thermowell tube 102. Tube 102 could have an open distal end 12' and could be used for pressure measurement, level detection or to convey something through tube 102 into a reactor, vessel, tank, apparatus or a machine.

Figure 8:
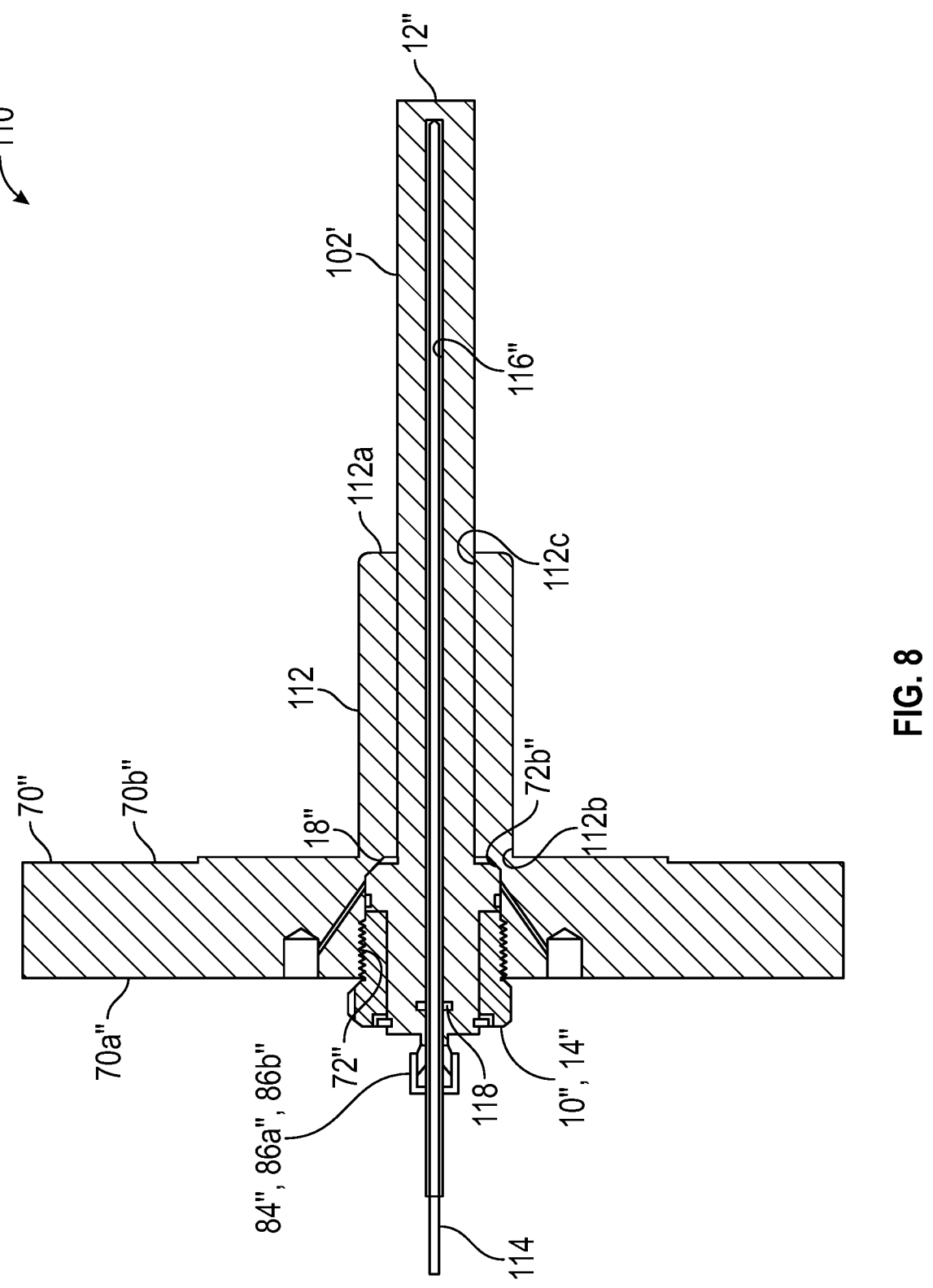
FIG. 8 is a side elevation in cross-section of a flange and thermocouple-thermowell assembly, where the flange has a support tube, according to the present invention.

FIG. 8 illustrates another end-use application of the present invention in a modified Van Stone thermowell assembly in a modified flange assembly. FIG. 8 is a side elevation in cross-section of a flange and thermowell assembly 110 in an exploded view, according to the present invention. Flange and thermowell assembly 110 of FIG. 8 is very similar to flange and thermowell assembly 100 of FIGS. 7 and 7A, except flange 70' has been replaced by a flange 70", which includes a support tube 112, and a thermocouple assembly 114 has been added. Flange and thermowell assembly 110 includes a conical seal fitting (CSF) 10" that preferably has all the features CSF 10 in FIG. 2, except as modified and described for CSF 10' in FIG. 7. CSF 10" has a generally tubular shape, an enclosed distal end 12", a proximal end 14", a length between the proximal and distal ends and a longitudinal bore 16" throughout the length. CSF 10" has an exterior conical sealing surface 18" that has a circumference that reduces in the direction of from the proximal end toward the distal end. A thermowell tube 102' extends between the conical sealing surface 18" and the distal end 12". CSF 10" of FIG. 8 is the same as and has all the same features as CSF 10' of FIG. 7, except the inside diameter of a bore 16" is less than the inside diameter of bore 16' in FIG. 7 for accommodating the thermocouple assembly 114 in FIG. 8.

FIG. 8 is similar to FIG. 7A, except as noted herein. FIG. 8 is an exploded view of a side elevation in cross section of the flange and thermowell assembly 110, which includes flange 70" or a portion of a flange, a conical seal fitting 10", a gland nut 60", a retaining ring 82", a nut 84" and ferrules 86a" and 86b". Flange 70" has a proximal side 70a", a distal side 70b" and a central opening 72". The central opening 72" for about half of that thickness on the proximal side 70a" is defined by interior threads 72a", which are designed, configured and sized to receive exterior threads on the gland nut 60". The central opening 72" has a first inside diameter on the proximal side 70a" of the flange 70 and a smaller second inside diameter on the distal side 70b" of the flange 70". An interior conical sealing surface 72b" provides a transition between the greater first inside diameter and the lesser second inside diameter. Interior conical sealing surface 72b" is located near, but is spaced apart from, the distal side 70b". A metal-to-metal seal is formed between an exterior conical sealing surface 18" on the CSF 10" fitting and the interior conical sealing surface 72b" in flange 70" as was described above.

Support tube 112 is attached to or formed integral with flange 70". Support tube 112 has a distal end 112a, a proximal end 112b and a bore 112c throughout its length. The proximal end 112b of support tube 112 surrounds the central opening 72" in the flange 70". Thermowell tube 102' passes through and is supported by support tube 112. Thermowell tube 102' passes freely through support tube 112, but preferably, only a small annular space is provided between the outside of theremowell tube 102' and the inside of support tube 112. With reference to the process conditions described in U.S. Pat. Nos. 7,465,086 and 10,996,113 for a typical application for a theremowell-thermocouple assembly, support tube 112 allows for a combination of support against forces applied on the distal end 12" of thermowell 102' and flexibility rather than rigidness.

Thermocouple assembly 114 is received in the bore 116" of the thermowell 102' and is used for measuring temperature in a process, reactor, vessel or in an apparatus. An equivalent of thermocouple assembly 114 is described in U.S. Pat. Nos. 7,465,086 and 10,996,113. Thermocouple assembly 114 includes thermocouple wires and a protective sheath around the wires. The wires are operatively connected to a thermocouple head (not shown) for transmission of electrical signals that can be converted to temperature measurements. The description of CSF 10 in FIG. 2 disclosed the internal groove 24b cut into the wall that defines the bore CSF 10 for receiving an O-ring. FIG. 8 shows an O-ring 118 received in an equivalent groove. The arrangement of O-ring 118 is different in that it is received in an internal groove, as illustrated by internal groove 24b in FIG. 2. A manufacturer places the O-ring 118 in its groove prior to installing the thermocouple assembly 114 in the CSF 10"

fitting. O-ring 118 provides a secondary seal around the thermocouple assembly 114, while ferrules 86a" and 86b" and nut 84" provide a primary seal as was described with reference to FIG. 6. A dual-seal arrangement is provided for sealing the fitting CSF 10" in the flange 70", and a dual-seal arrangement is provided for sealing the thermocouple assembly 114 within the fitting CSF 10".

Figure 9:
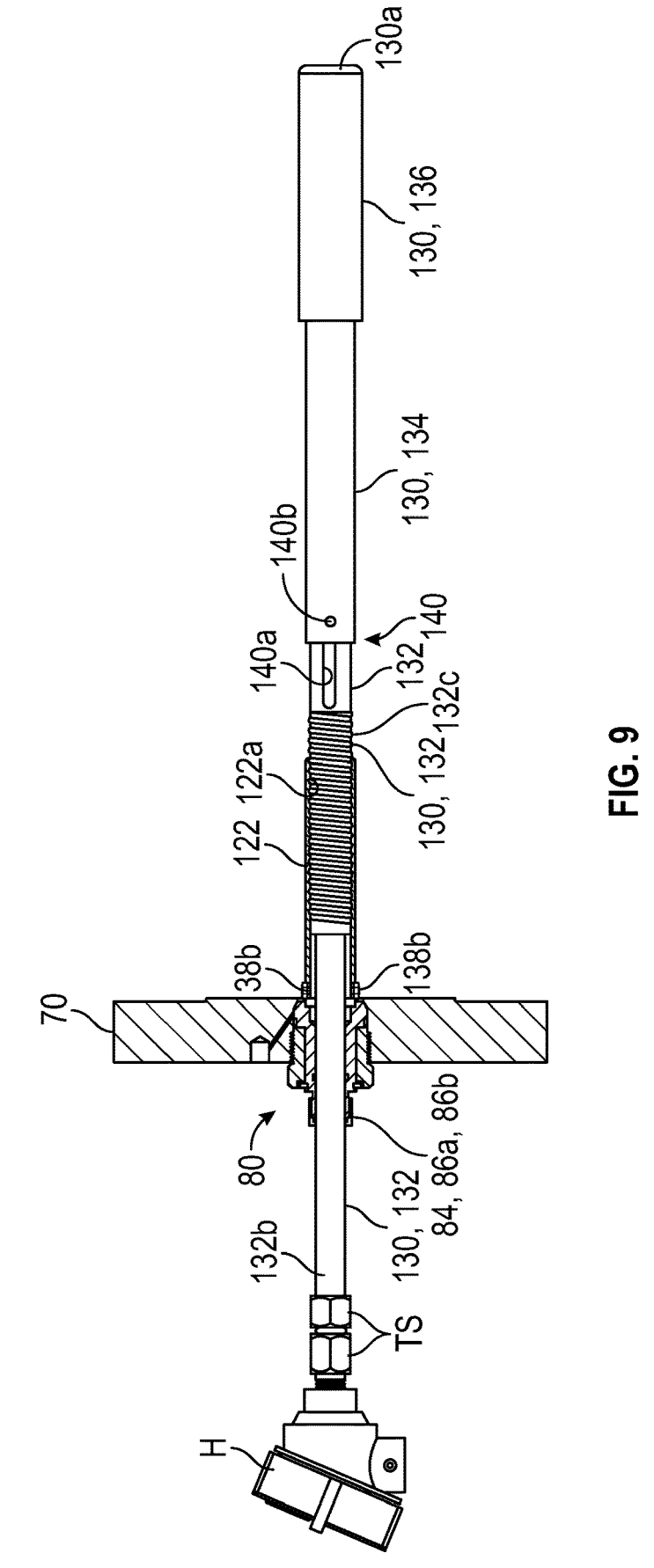
FIG. 9 is a side elevation in cross-section of a flange and thermocouple-thermowell assembly, where the length of the thermowell assembly can be adjusted and where the thermowell assembly has an expansion joint, according to the present invention.

FIG. 9 is a side elevation in partial cross-section of an assembly 120 with a conical seal fitting. Assembly 120 includes the flange-and-fitting assembly 80 of FIG. 6 with the full flange 70 of FIG. 4 and a thermowell-thermocouple assembly received in the flange-and-fitting assembly. FIG. 9 illustrates how the flange-and-fitting assembly 80 of FIG. 6 and flange 70 of FIG. 4 can be used to receive a thermowell tube assembly, such as described in U.S. Pat. Nos. 7,465,086 and 10,996,113. A length-adjustment tube 122 having interior threads 122a is received in hollow cylinder 38 of flange-and-fitting assembly 80 of FIG. 6. Length-adjustment tube 122 is similar to the hollow internal fitting 60 described in the U.S. Pat. Nos. 7,465,086 and 10,996,113 patents, except length-adjustment tube 122 is received in hollow cylinder 38 rather than being threaded into a flange. Hollow cylinder 38 has holes 38a, which are defined by interior threads. A screw 38b having exterior threads is received in each hole 38a and pressed against length-adjustment tube 122 for fastening length-adjustment tube 122 to the flange-and-fitting assembly 80. Hollow cylinder 38 preferably has more than one hole 38a with three or four holes 38a being preferred, where each hole 38a receives a screw 38b. Pins would be preferred to the screws 38b in large-scale manu-facturing. Screws or pins 38b prevent rotation of length-adjustment tube 122 with respect to the flange-and-fitting assembly 80 and flange 70, but preferably do not provide a rigid connection so that this connection allows for some movement of a thermowell tube assembly with respect to the flange 70.

A thermowell-thermocouple assembly 130 is received in and passes through the length-adjustment tube 122 and the flange-and-fitting assembly 80. Thermowell-thermocouple assembly 130 comprises a number of different components including a first tube 132 having a distal end 132a and a proximal end 132b, a second tube 134 received on and surrounding the distal end 132a of the first tube 132 and an end cap 136, which preferably comprises a ceramic material. First tube 132 has exterior threads 132c that are matingly received in the interior threads 122a in the length-adjust-ment tube 122. Rotation of the thermowell-thermocouple assembly 130 with respect to the length-adjustment tube 122 changes the distance between the flange 70 and a distal end 130a of the thermowell-thermocouple assembly 130, thereby adjusting the length of the thermowell-thermo-couple assembly 130 within a process vessel on which the flange 70 is installed. See U.S. Pat. Nos. 7,465,086 and 10,996,113 for more details about length-adjustment tube 122, particularly the threading that is preferred, which is preferably a somewhat loose connection that allows some movement, and the method for establishing the depth or length. After the depth of the thermowell-thermocouple assembly 130 is at a desired point in a vessel, nut 84 is engaged with the exterior threads 32 on the fitting 10 and tightened, which causes the ferrules 86a and 86b to seal the thermowell-thermocouple assembly 130 with the fitting 10, thereby providing a tube seal.

The length-adjustment tube 122 and the exterior threads 132c on the thermowell-thermocouple assembly 130 are optional features. A thermowell-thermocouple assembly that does not have length-adjustment features can be received in and through the flange-and-fitting assembly 80 of FIG. 6. A complete flange 70 is also an optional feature as a block of material having a through-hole defined in part by interior threads to receive the gland nut 60 and an interior conical sealing surface 72b to matingly receive the exterior conical sealing surface 18 is satisfactory for some end-use applica-tions of the present invention.

Thermowell-thermocouple assembly 130 preferably has an expansion joint 140 for accommodating and tolerating various forces exerted on the assembly, such as the forces that cause expansion and contraction due to changes in temperature. The thermowell-thermocouple assembly 130 and its expansion joint 140 are described in the U.S. Pat. No. 10,996,113. Expansion joint 140 is an optional feature, but is preferred for some end-use applications such as described in the U.S. Pat. No. 10,996,113. The expansion joint 140 illustrated in FIG. 9 uses a pin-and-slot mechanism, prefer-ably with a spring. Expansion joint 140 includes a longitu-dinal slot 140a, which can be seen in FIG. 9, and a pin 140b. Pin 140b is in threaded engagement with the second tube 134 and extends into the longitudinal slot 140a in the distal end 132a of the first tube 132. There are preferably three pins or screws, one for each of preferably three slots spaced evenly around the circumference of the first tube 132, but only one slot 140a and one pin or screw 140b are shown in this cross-section. A spring is preferably received inside second tube 134, which pushes the distal end 130a of the thermowell-thermocouple assembly 130 away from the flange 70. A thermocouple assembly is received in the thermowell-thermocouple assembly 130 for measuring tem-perature. See the description of and FIGS. 10A and 10B in the U.S. Pat. No. 10,996,113 for a more detailed description of a thermowell-thermocouple assembly that has the expan-sion joint 140. Examples of expansion joints include unsup-ported bellows, bellows that have a support sleeve around the bellows, a sliding, hexagonal coupling with crimping to hold the sliding tubes together, a pin-and-slot coupling and a spring-loaded, pin-and-slot sliding connection, each of which is described in the U.S. Pat. No. 10,996,113. Expan-sion joint 140 in FIG. 9 is a spring-loaded, pin-and-slot sliding connection. The adjustable length thermowell tube described in the U.S. Pat. No. 7,465,086, the flexible ther-mowell tube described in the U.S. Pat. No. 10,996,113 or a standard thermowell can be used as the thermowell-thermo-couple assembly 130. Each thermowell-thermocouple assembly preferably includes thermocouple wire as described in the U.S. Pat. No. 10,996,113.

Another end-use application of the block-and-fitting assembly 80 of FIG. 6 is in replacing certain components in the thermowell mounting system TMS illustrated in FIG. 1. A thermowell tube can pass through the flange-and-fitting assembly 80 of FIG. 6 like the thermocouple-thermowell assembly T in FIG. 1 passes through the fitting F in FIG. 1. In this application, the flange-and-fitting assembly 80 of FIG. 6 replaces the flange FL and the fitting F in FIG. 1. With reference to the U.S. Pat. No. 7,465,086, FIG. 1 shows a hollow tube having interior and exterior threads threaded into the flange FL and exterior threads on the thermocouple-thermowell assembly T engaged with the interior threads in the hollow tube for length adjustment. The support tube 112 in FIG. 8 can be made with interior threads and can replace the hollow tube shown in FIG. 1 to provide both length adjustment as described in the U.S. Pat. No. 7,465,086 and support for the thermocouple-thermowell assembly T.

The conical seal fitting 10 is one embodiment of the present invention. The combination of the CSF 10 and the load gland 60 is another embodiment of the present invention. The flange-and-fitting assembly 80 is another embodiment of the present invention. The flange-and-fitting assembly 80 of FIG. 6 can be used with a thermocouple-thermowell assembly for temperature measurement. However, the flange-and-fitting assembly 80 can be used in any application in which it is necessary for a tube to protrude into a vessel. The present invention can be used in an application in which a tube protrudes out of an enclosed space and requires a good seal. Various sensors may be in a tube or may have a tubular shape. The tube could be for pressure measurement, level detection or to convey something through the tube into the vessel. The flange-and-fitting assembly 80 of FIG. 6 is not limited to any particular applications. It should also be noted that the flange 70 is optional. Large process vessels tend to have flanged openings for which flange-and-fitting assembly 80 is appropriate. However, a pipe, a machine or a smaller apparatus may not use a flanged opening and may instead have a small opening that is not flanged. A pipe, machine or an apparatus can be built with an opening that is defined by internal threads and an interior conical sealing surface, and the CSF fitting 10 and the load gland 60 can be designed, configured and sized for use in the pipe, machine or apparatus. FIG. 6 illustrates another option in which the portion 70 shown for flange 70 is instead a block that can be welded into an opening in a flange, pipe, machine or apparatus, so rather than making flange-and-fitting assembly 80 with a full flange such as shown in FIG. 1, the assembly 80 could have merely the small block 70 shown in FIG. 6. An assembly 80 as illustrated in FIG. 6 can be made in a number of different sizes and materials for use in a variety of applications.

The problem that was identified with reference to FIG. 1 is that sometimes a leak occurs where the threads Te on the fitting F engage the threads Ti in the flange FL, which is typically discovered by pressurizing a vessel in which the fitting F is installed and checking whether the fitting F leaks. If the fitting F does leak and tightening does not stop the leak, then it is necessary to shut down the vessel and release the pressure in order make repairs or to replace the fitting F or the thermowell mounting system TMS. Pressurizing the vessel can be considered an interior leak test. The present invention allows an exterior leak test of the fitting of the present invention from outside of a vessel after the fitting is installed and before the vessel is pressurized. The fitting 10 and the gland nut 60 can be installed in a flange like flange 70 that has an interior conical sealing surface and a leak test port like port 74 and duct 74*b*. An annular space as described for annular space 92 can be pressurized, and if the conical surface seal 18-72*b* or the O-ring 90 leaks, the pressure will decrease rather quickly due to a very small volume in the annular space 92. It is quite possible to stop a leak by tightening the gland nut 60 more, but in any case, the leak problem can be addressed before pressurizing the vessel. A metal-to-metal conical surface seal 18-72*b* is a better seal than a threaded engagement using NPT threads, and the metal-to-metal conical surface seal can be tested using an exterior leak test in which the annular space 92 is pressurized and the pressure monitored for no loss of pressure. The conception of this arrangement of elements was an inventive step over the prior art of FIG. 1.

The present invention provides benefits and advantages over prior art such as represented in FIG. 1. With reference to FIG. 1, hollow fitting F threads into flange FL. A sealant is used between external threads Te and internal threads Ti to fill any gaps between the threads. If the seal between the fitting F and the flange FL begins to leak, one can rotate the fitting F in an attempt to seal the threaded connection, but at some point the sealant fails, and one has no option other than shutting down and repairing or replacing the threaded engagement. The applicant believes that if the metal-to-metal seal between surfaces 18 and 72*b* in the present invention begins to leak, the load gland 60 can be tightened, thereby deforming one or both of the metal surfaces 18 and 72*b* until a seal is re-established. Another benefit of the present invention over the prior art of FIG. 1 is that O-ring 90 provides a secondary or back-up seal to the metal-to-metal seal between surfaces 18 and 72*b*. Another advantage of the present invention over the prior art of FIG. 1 is that an O-ring received in internal groove 24*b* provides a secondary seal around a tube received in the flange-and-fitting assembly 80 to complement a primary seal provided by one or both of ferrules 86*a* and 86*b*. The prior art represented by FIG. 1 is described in U.S. Pat. Nos. 7,465,086 and 10,996, 113, issued to Foreman, Jr., each of which is incorporated by reference. These prior art patents include descriptions of elements for preventing the back out or blowout under high pressure of a thermowell-thermocouple assembly. With a proper design and configuration of a tube received in flange-and-fitting assembly 80, the interior shoulder 46 and the interior conical surface 50 provide stops for preventing the tube from backing out or blowing out of the assembly 80.

One important benefit is that the test port 74 with its duct 74*b* connected to the annular space 92 between the metal-to-metal seal 18-72*b* and the O-ring 90 allows for testing whether the metal-to-metal seal 18-72*b* leaks after assembly and before a process unit, apparatus or machine in which it is installed is started up. The prior art assembly of FIG. 1 is typically tested by installing the assembly in a process unit, apparatus or machine and starting up the same, in which case, if there is a leak and tightening does not stop the leak, then the process unit, apparatus or machine must be shut down and the leak fixed in some manner. The ability to use the test ports 74 and 76 in the flange 70 for ongoing monitoring of the integrity of the metal-to-metal seal to ensure there is no leakage through the sealing area is another benefit of the present invention.

There are many examples of prior art conical metal-to-metal seals. The exterior surface between the first groove 22 and the conical sealing surface 18 CSF 10 preferably does not have threads, while there are many prior art examples where threads are in this location. Such prior art connections require rotation of one conical metal seal with respect to a mating conical metal seal. The present invention allows for placement of a sensor tube, such as a thermowell tube, in a desired location and in a desired position, after which a metal-to-metal seal is formed without the need to rotate the sensor or thermowell tube. The O-ring 90 described with reference to FIG. 6 provides a further advantage of a secondary seal to the metal-to-metal seal. The test port 74 and its duct 74*b* provide a connection to the annular space 92 described with reference to FIG. 6, which allows the manufacturer of the flange-and-fitting assembly 80 described with reference to FIGS. 5 and 6 to test the metal-to-metal seal before a product is shipped to a customer, thereby allowing the customer to install the product with confidence that the metal-to-metal seal in the product will not leak. More typically, the metal-to-metal conical seal 18-72*b* is tested after installation, but before start up and pressurizing a vessel, reactor, machine or apparatus. Another seal is around a tube received in the flange-and-fitting assembly 80, such as a thermocouple assembly. Tightening the nut 84 against the ferrules 86*a* and 86*b* squeezes the ferrules against the tube, thereby providing a primary seal. O-rings are normally used around the exterior of a tubular element with O-ring 90 being an example of an O-ring around the exterior of a tubular element. O-ring 118 described with reference to FIG. 8 is received in an internal groove like the groove 24b in FIG. 2 rather than in an external groove like the groove 22 that receives O-ring 90 as described with reference to FIGS. 5 and 6. O-ring 118 provides a secondary seal around the thermocouple assembly 114. Two dual-seal arrangements have been disclosed and described herein. One dual-seal arrangement is provided for sealing the fitting CSF 10" in the flange 70", and another dual-seal arrangement is provided for sealing the thermocouple assembly 114 within the fitting CSF 10".

Another benefit of the present invention is provided by the retaining ring 82, which prevents the gland nut 60 from backing out of engagement with the flange 70. After the metal-to-metal conical seal 18-72b has been in use for an extended period of time at operating pressures and temperatures, it can be difficult to remove the fitting 10 from the flange 70. After a vessel, reactor, machine or apparatus containing and using the flange-and-fitting assembly 80 for a period of time has been shut down, the gland nut 60 can be rotated for removal from the flange 70. The gland nut 60 presses against the retaining ring 82 during removal of the gland nut 60 from the flange 70, which applies a force through the retaining ring 82 on the fitting 10, thereby breaking the seal between the conical sealing surfaces 18-72b and allowing the fitting 10 to be removed from the flange 70.

One embodiment of the present invention comprises a conical seal (CSF) having a generally tubular shape, proximal and distal ends, a length between the proximal and distal ends and a longitudinal bore throughout the length, where the CSF has an exterior conical sealing surface proximal to the distal end, where the conical sealing surface has a circumference that reduces in the direction of from the proximal end toward the distal end, where the CSF has a first portion adjacent to the conical sealing surface and toward the proximal end, where the CSF has a second portion adjacent to the first portion and toward the proximal end, where the first and second portions have outside diameters, where the outside diameter of the second portion is less than the outside diameter of the first portion, and where the CSF has a first shoulder defined at a transition between the first and second portions. The first portion preferably has a first groove around its circumference that is spaced apart from the exterior conical sealing surface and between the first shoulder and the exterior conical sealing surface, where the first groove is configured to receive an O-ring. The first portion preferably has a first exterior surface between the first groove and the exterior conical sealing surface that does not have threads because such threads would serve no purpose. The exterior conical sealing surface preferably has an angle relative to a longitudinal axis of the CSF that is between about 52 and about 68 degrees with about 59 degrees being particularly preferred.

The CSF preferably has a third portion adjacent to the second portion that extends toward the proximal end and terminates at the proximal end of the CSF. The third portion preferably provides elements for a tube seal. The third portion preferably has an interior conical sealing surface adjacent to the proximal end configured to receive a ferrule and exterior threads adjacent to the proximal end configured to receive a nut for tightening the ferrule against a tube received in the bore of the CSF, thereby sealing the tube in the CSF. The third portion preferably has an outside diameter that is less than the outside diameter of the second portion, preferably with an abrupt transition, thereby providing a shoulder between the second and third portions. The second portion preferably has a second groove around its circumference proximal to the third portion for receiving a retaining ring.

A tubular element is preferably attached to or formed integral with the distal end of the CSF. The tubular element is preferably either a short cylinder that provides a connection point for a tube such as a thermowell or a tube, where the tube can be a thermowell with a closed distal end, a tube for holding or containing or protecting a sensor of some type or a tube with an open end. The tubular element preferably has a circumference that is less than the smallest circumference of the exterior conical sealing surface, and the CSF preferably has a shoulder defined at an abrupt transition between the exterior conical sealing surface and the tubular element.

The longitudinal bore in the CSF preferably has a first inside diameter at the distal end and a second inside diameter at the proximal end, where the first inside diameter is greater than the second inside diameter. The longitudinal bore preferably has a third inside diameter between the first and second inside diameters, where the third inside diameter is less than the first inside diameter, and where the third inside diameter is greater than the second inside diameter. The CSF preferably has an interior shoulder defined at a transition between the first inside diameter and the third inside diameter. The CSF preferably also has an interior conical surface at a transition between the third inside diameter and the second inside diameter.

A fitting assembly according to the present invention preferably includes (1) a block of material such as a flange or a portion of a flange, which has proximal and distal sides, a thickness between the proximal and distal sides, where the block defines a through hole between the proximal and distal sides that has a smallest diameter at and adjacent to the distal side of the block, an interior conical sealing surface proximal to the smallest diameter that has a smaller inside diameter proximal to the distal side and a greater inside diameter distal to the distal side and interior threads between the proximal side and the interior conical sealing surface; (2) a tubular fitting designed and configured to be received in the through hole in the block, wherein the tubular fitting has proximal and distal ends, a bore between the proximal and distal ends, an exterior conical sealing surface proximal to the distal end that is designed and configured for engagement with the interior conical sealing surface, an exterior shoulder between the proximal end and the exterior conical sealing surface; and (3) a load gland or gland nut, which is hollow and has exterior threads and is designed and configured to surround the tubular fitting and abut the exterior shoulder on the tubular fitting and to threadedly engage the interior threads of the block for pressing the exterior conical sealing surface against the interior conical sealing surface.

Having described the invention above, various modifications of the techniques, procedures, materials, and equipment will be apparent to those skilled in the art. It is intended that all such variations within the scope and spirit of the invention be included within the scope of the appended claims.

What is claimed is:

1. A conical seal fitting comprising:
   a conical seal fitting (CSF) having a generally tubular shape, proximal and distal ends, a length between the proximal and distal ends and a longitudinal bore throughout the length, wherein the CSF is designed and configured to receive and seal a tube that extends through the bore of the CSF, wherein the CSF has an exterior conical sealing surface proximal to the distal end, wherein the conical sealing surface has a circumference that reduces in the direction of from the proximal end toward the distal end, wherein the CSF has a first portion adjacent to the conical sealing surface and toward the proximal end, wherein the CSF has a second portion adjacent to the first portion and toward the proximal end, wherein the first and second portions have outside diameters, wherein the outside diameter of the second portion is less than the outside diameter of the first portion, wherein the CSF has a first shoulder defined at a transition between the first and second portions, wherein the first portion has a first groove around its circumference that is spaced apart from the exterior conical sealing surface, wherein the first groove is between the first shoulder and the exterior conical sealing surface, and wherein the first groove is designed and configured to receive an O-ring for providing a seal that is secondary to a primary seal formed with the exterior conical sealing surface.

2. The conical seal fitting of claim 1, wherein the CSF has a third portion adjacent to the second portion and toward the proximal end, wherein the third portion terminates at the proximal end of the CSF, wherein the third portion has an interior conical surface adjacent to the proximal end configured to receive a ferrule, wherein the third portion has an exterior threaded surface adjacent to the proximal end configured to receive a nut, and wherein the ferrule and the nut are designed and configured to seal the tube in the CSF.

3. The conical seal fitting of claim 2, wherein the second portion has an interior cylindrical wall that defines the longitudinal bore in the second portion, and wherein the interior cylindrical wall has an internal groove for receiving an internal O-ring for providing a secondary seal for the tube.

4. The conical seal fitting of claim 3, wherein the conical seal fitting has inside diameters proximal to its distal and proximal ends, and wherein the inside diameter proximal to the distal end is greater than the inside diameter proximal to the proximal end.

5. The conical seal fitting of claim 4, wherein the second portion of the CSF has a second groove around its circumference that is designed and configured to receive a retaining ring.

6. The conical seal fitting of claim 2, further comprising a tubular element between the distal end and the exterior conical sealing surface.

7. The conical seal fitting of claim 6, wherein the tubular element is a cylinder that has a circumference that is less than the circumference of the exterior conical sealing surface, and wherein the CSF has a second shoulder defined at a transition between the exterior conical sealing surface and the cylinder.

8. The conical seal fitting of claim 7, wherein the longitudinal bore has a first inside diameter at the distal end and a second inside diameter at the proximal end, wherein the first inside diameter of the bore is greater than the second inside diameter of the bore, and wherein the first inside diameter at the distal end is the inside diameter of the cylinder.

9. The conical seal fitting of claim 8, wherein the longitudinal bore has a third inside diameter between the first and second inside diameters of the bore, wherein the third inside diameter of the bore is less than the first inside diameter of the bore, and wherein the third inside diameter of the bore is greater than the second inside diameter of the bore.

10. The conical seal fitting of claim 9, wherein the CSF has an interior shoulder or an interior conical surface defined at a transition between the first inside diameter of the bore and the third inside diameter of the bore.

11. The conical seal fitting of claim 4, wherein the first portion has a first-portion interior wall that defines the longitudinal bore in the first portion, and wherein the first-portion interior wall has a shoulder or a conical surface.

12. An assembly with a conical seal fitting comprising:
a conical seal fitting according to claim 2; and
a gland nut surrounding the conical seal fitting, wherein the gland nut has proximal and distal ends, wherein the distal end of the gland nut abuts the first shoulder on the CSF, wherein
the gland nut has an exterior surface, and wherein the exterior surface of the gland nut has exterior threads.

13. The assembly of claim 12, wherein the second portion of the CSF has an interior cylindrical wall that defines the longitudinal bore in the second portion, and wherein the interior cylindrical wall has an internal groove for receiving an internal O-ring for providing a secondary seal for the tube.

14. The assembly of claim 13, wherein the conical seal fitting has inside diameters proximal to its distal and proximal ends, and wherein the inside diameter proximal to the distal end is greater than the inside diameter proximal to the proximal end.

15. The assembly of claim 14, wherein the second portion of the CSF has a second groove around its circumference that is designed and configured to receive a retaining ring.

16. A block-and-fitting assembly with a conical seal fitting comprising:
a block of material having opposing proximal and distal sides, wherein the block of material has a through-hole between its proximal and distal sides, wherein at least a portion of the through-hole is defined by interior threads; and
the assembly of claim 12 received in the through-hole, wherein the exterior threads on the gland nut are matingly engaged with the interior threads in the block of material, wherein the block of material has an interior conical sealing surface, and wherein the block of material and the CSF are designed and configured so that the exterior conical sealing surface on the CSF matingly engages the interior conical sealing surface in the block of material to provide a seal.

17. The block-and-fitting assembly of claim 16, wherein the second portion of the CSF has an interior cylindrical wall that defines the longitudinal bore in the second portion, and wherein the interior cylindrical wall has an internal groove for receiving an internal O-ring for providing a secondary seal for the tube.

18. The block-and-fitting assembly of claim 17, wherein the conical seal fitting has inside diameters proximal to its distal and proximal ends, and wherein the inside diameter proximal to the distal end is greater than the inside diameter proximal to the proximal end.

19. The block-and-fitting assembly of claim 18, further comprising an O-ring received in the first groove in the CSF, wherein an annular space is defined between the O-ring, the seal, the block of material and the CSF, further comprising a test port in the block of material, wherein the test port is an open passageway between the proximal side of the block of material and the annular space.

20. The block-and-fitting assembly of claim 18, wherein the block of material is a flange.

21. A thermowell tube assembly with a conical seal fitting comprising:

the block-and-fitting assembly of claim 18; and a thermowell tube received in the longitudinal bore of the CSF.

22. The thermowell tube assembly of claim 21, further comprising an O-ring received in the first groove in the CSF.

23. The thermowell tube assembly of claim 22, further comprising a thermocouple assembly received in the thermowell tube.

24. A thermowell tube assembly comprising:

a block-and-fitting assembly with a conical seal fitting, wherein the block-and-fitting assembly comprises a block of material having opposing proximal and distal sides, wherein the block of material has a through-hole between its proximal and distal sides and an interior conical sealing surface that defines a portion of the through-hole, and wherein at least a portion of the through-hole is defined by interior threads; and a conical seal fitting assembly received in the block-and-fitting assembly, wherein the conical seal fitting assembly comprises a conical seal fitting according to claim 2, wherein the conical seal fitting has inside diameters proximal to its distal and proximal ends, and wherein the inside diameter proximal to the distal end is greater than the inside diameter proximal to the proximal end; an O-ring in the first groove; and a gland nut surrounding the conical seal fitting, wherein the gland nut has proximal and distal ends, wherein the distal end of the gland nut abuts the first shoulder on the CSF, wherein the gland nut has an exterior surface, and wherein the exterior surface of the gland nut has exterior threads that are engaged with the interior threads in the block of material, and wherein the exterior conical sealing surface of the CSF is engaged with the interior conical sealing surface of the block of material for providing a primary seal;

a thermowell tube received in the longitudinal bore of the conical seal fitting; and a thermocouple assembly received in the thermowell tube.

25. The thermowell tube assembly of claim 24, wherein an annular space is defined between the O-ring, the exterior conical sealing surface, the block of material and the CSF, further comprising a test port in the block of material, wherein the test port is an open passageway between the proximal side of the block of material and the annular space.

26. The thermowell tube assembly of claim 24, wherein the second portion of the CSF has an interior cylindrical wall that defines the longitudinal bore in the second portion, and wherein the interior cylindrical wall has an internal groove, further comprising an internal O-ring received in the internal groove, wherein the internal O-ring surrounds the thermowell tube.

27. The thermowell tube assembly of claim 24, wherein the CSF further comprises a cylinder between the distal end of the CSF and the exterior conical sealing surface of the CSF, further comprising a length-adjustment tube received in the cylinder, wherein the length-adjustment tube has interior threads, and wherein the thermowell tube has exterior threads matingly engaged with the interior threads of the length-adjustment tube.

28. The thermowell tube assembly of claim 24, wherein the thermowell tube has an expansion joint.

29. The thermowell tube assembly of claim 27, wherein the thermowell tube has an expansion joint.

30. A tubular assembly with a conical seal fitting comprising:

a block of material having opposing proximal and distal sides, wherein the block of material has a through-hole between its proximal and distal sides and an interior conical sealing surface that defines a portion of the through-hole, and wherein at least a portion of the through-hole is defined by interior threads;

a conical seal fitting assembly received in the block-and-fitting assembly, wherein the conical seal fitting assembly comprises a conical seal fitting according to claim 2; an O-ring in the first groove; and a gland nut surrounding the conical seal fitting, wherein the gland nut has proximal and distal ends, wherein the distal end of the gland nut abuts the first shoulder on the conical seal fitting, wherein the gland nut has an exterior surface, and wherein the exterior surface of the gland nut has exterior threads that are engaged with the interior threads in the block of material, and wherein the exterior conical sealing surface of the conical seal fitting is engaged with the interior conical sealing surface of the block of material for providing a primary seal; and a thermowell tube attached to or formed integral with the distal end of the conical seal fitting.

31. The tubular assembly of claim 30, wherein the second portion of the conical seal fitting has an interior cylindrical wall that defines the longitudinal bore in the second portion, and wherein the interior cylindrical wall has an internal groove for receiving an internal O-ring for providing a secondary seal for the tube.

32. The tubular assembly of claim 31, wherein an annular space is defined between the O-ring, the seal between the interior and exterior conical sealing surfaces, the block of material and the CSF, further comprising a test port in the block of material, wherein the test port is an open passageway between the proximal side of the block of material and the annular space.

33. The tubular assembly of claim 31, wherein the tube in claim 1 is a tubular thermocouple assembly, further comprising an internal O-ring received in the internal groove.

34. The tubular assembly of claim 30, wherein the tube in claim 1 is a tubular thermocouple assembly, further comprising a support cylinder attached to or formed integral with the block of material, wherein the support cylinder is located on the distal side of the block of material and surrounds the thermowell tube.

35. The tubular assembly of claim 34, wherein the block of material is a flange, wherein the second portion of the conical seal fitting has an interior cylindrical wall that defines the longitudinal bore in the second portion, and wherein the interior cylindrical wall has an internal groove for receiving an internal O-ring, further comprising an internal O-ring received in the internal groove for providing a secondary seal for the tubular thermocouple assembly.

36. A tubular sensor assembly with a conical seal fitting comprising:

a block having opposing proximal and distal sides, wherein the block defines a through-hole between the proximal and distal sides that has a smallest diameter at and adjacent to the distal side of the block, an interior conical sealing surface proximal to the smallest diameter that has a smaller inside diameter proximal to the distal side and a greater inside diameter distal to the distal side and interior threads between the proximal side and the interior conical sealing surface;

a conical seal fitting (CSF) according to claim 2 received in the through-hold in the block; and a gland nut surrounding the CSF and abutting the exterior shoulder on the CSF, wherein the gland nut has exterior threads and is designed and configured to threadedly engage the interior threads of the block for pressing the exterior conical sealing surface of the CSF against the interior conical sealing surface of the block to form a seal.

37. The tubular sensor assembly of claim 36, wherein the block is a flange, and wherein the CSF has inside diameters proximal to its distal and proximal ends, and wherein the inside diameter proximal to the distal end is greater than the inside diameter proximal to the proximal end, further comprising a thermowell tube received in the CSF and a thermocouple assembly received in the thermowell tube.

38. The tubular sensor assembly of claim 37, wherein the block is a flange, further comprising a sensor tube received in the bore of the conical seal fitting and a sensor assembly for measuring temperature, pressure or level received in the sensor tube.

\* \* \* \* \*